Oct. 3, 1961 W. R. ALEXANDER 3,003,124

BRIDGE MODULATOR

Filed April 15, 1959 2 Sheets-Sheet 1

INVENTOR.
WARREN R. ALEXANDER

BY
Richard G. Stahr
ATTORNEY

Oct. 3, 1961 W. R. ALEXANDER 3,003,124

BRIDGE MODULATOR

Filed April 15, 1959 2 Sheets-Sheet 2

INVENTOR.
WARREN R. ALEXANDER

BY

Richard G. Stahr
ATTORNEY

United States Patent Office 3,003,124

Patented Oct. 3, 1961

3,003,124

BRIDGE MODULATOR

Warren R. Alexander, Pittsford, N.Y., assignor to General Dynamics Corporation, Rochester, N.Y., a corporation of Delaware Filed Apr. 15, 1959, Ser. No. 806,577
6 Claims. (Cl. 332—47)

Figure 1:
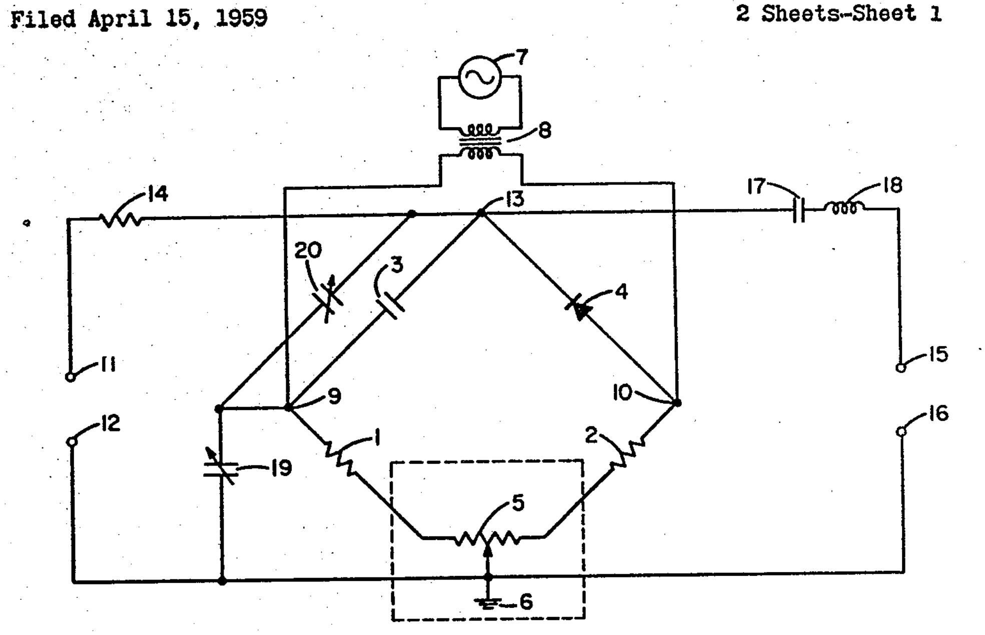

The present invention relates to converter devices of the modulator type which convert direct current signals to alternating current signals and, more specifically, to a bridge modulator of this type employing at least one variable impedance element.

Frequently, electrical or electronic equipment must be employed with direct current signals of an extremely low level or with direct current signals of variable levels in which the relative magnitudes of change are extremely small. As it is difficult to design electrical or electronic equipment with sufficient sensitivity to operate on the basis of these extremely low levels or extremely small differences in magnitude, it has become necessary to amplify direct current signals of this type for the purpose of rendering them compatible with the equipment with which they are to be used. An important method of achieving a stable amplification of low level direct current signals or direct current signals having extremely small differences in magnitude is that of converting these signals into an alternating current signal which may be amplified to a useful level of magnitude.

For example, in the field of nuclear power, the direct current signals produced by a conventional compensated ion chamber radiation detector may be of such a low level that they must be amplified to be of a magnitude great enough to be used with associated electronic equipment. Similarly, the direct current signals which are produced by a thermocouple device may not only be of an extremely low level but may be variable in nature with only minute differences in relative magnitude. In this application also, it is necessary that these signals be amplified to a magnitude great enough to be used with associated equipment.

Although diode ring converters of the modulator type have been employed in the past for effecting the conversion of low level direct current potentials to proportional alternating current potentials, they have included two or more diodes in the bridge circuit. As electrical components of this type are temperature sensitive to the extent that the operating characteristics change with changes in ambient temperature, it has been necessary to include complex temperature compensating devices with converter-modulators of this type for the purpose of maintaining stability over a wide ambient temperature range.

In view of the increasingly widespread use of applications of this type, the requirement for a direct current to alternating current converter and modulator which is simple in construction and reliable in operation is apparent.

It is, therefore, an object of this invention to provide an improved converter of the modulator type which converts direct current signals to alternating current signals.

It is another object of this invention to provide an improved converter of the modulator type which employs bridge circuitry for converting direct current signals to alternating current signals.

It is another object of this invention to provide an improved converter of the modulator type which employs bridge circuitry including a variable impedance element in one leg thereof for converting direct current signals to alternating current signals.

It is another object of this invention to provide an improved converter of the modulator type which employs bridge circuitry including a variable impedance element in one leg thereof and temperature compensating circuitry for converting direct current signals to alternating current signals.

In accordance with this invention, there is provided a converter of the modulator type for converting direct current signals to alternating current signals and which is of a bridge-type configuration comprising respective impedance elements in each leg thereof and arranged to provide an impedance balance under selected reference conditions wherein one of the impedance elements is a variable impedance element of the type possessing impedance value characteristics which are a function of bias potential. Across one diagonal of the bridge configuration is connected the source of direct current input signals to be converted in such a manner that the direct current input signals serve as a bias potential across the variable impedance element thereby producing varying degrees of impedance imbalance within the bridge configuration with changes in magnitude of the direct current input signals while a source of alternating current signals to be modulated is connected across the opposite diagonal of the bridge whereby the impedance imbalance within the bridge as produced by the direct current input signals results in the conduction of the alternating current signals through the bridge, the magnitude of which is a function of the degree of imbalance, thereby effecting an amplitude modulation of the alternating current signals by the direct current input signals.

Figure 4:
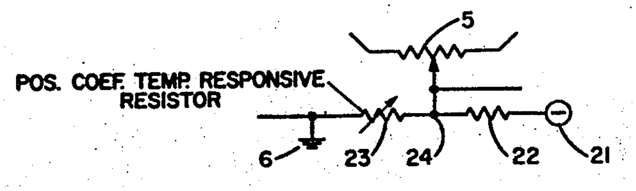
Figure 5:
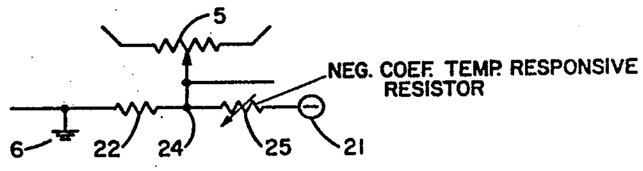
Figure 6:
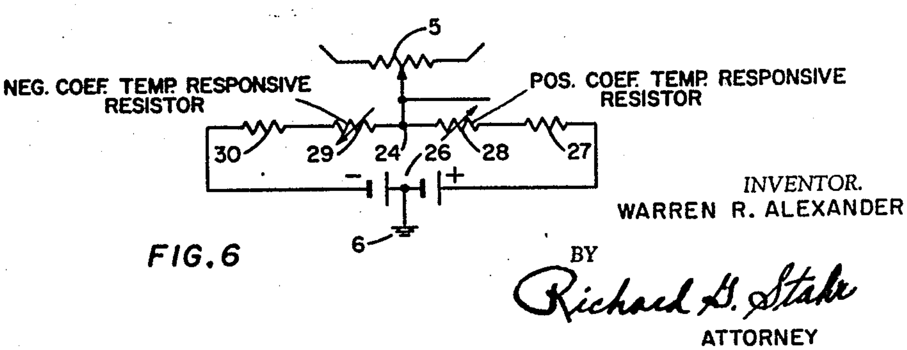
Figure 2:
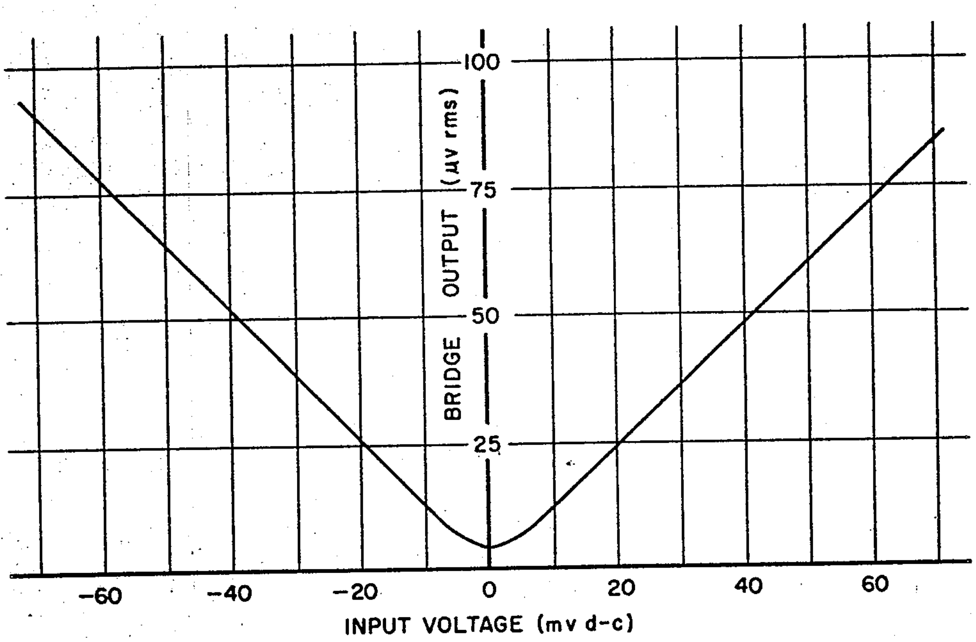
Figure 3:
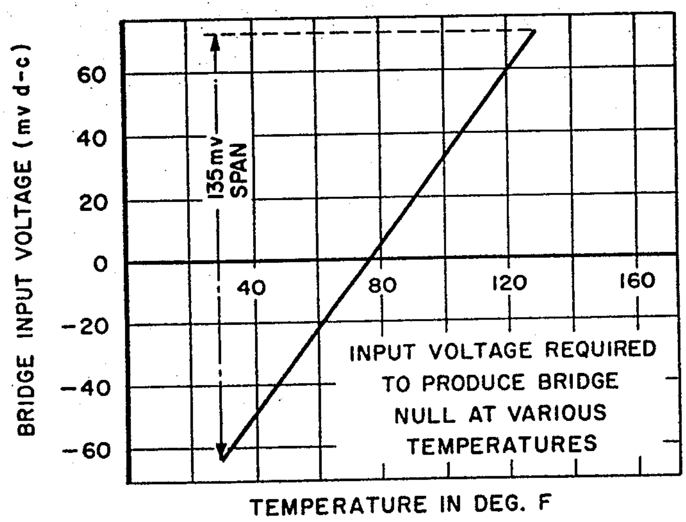

For a better understanding of the present invention, together with further objects, advantages and features thereof, reference is made to the following description and accompanying drawings in which:

FIGURE 1 is a schematic circuit diagram of a preferred embodiment of the device of this invention;

FIGURE 2 graphically illustrates the magnitudes of alternating current output potentials with different magnitudes of direct current input signal potentials;

FIGURE 3 graphically illustrates a typical compensating bias potential curve indicating the temperature compensating bias potentials which may be required with the variable impedance element used with the device of this invention over a range of ambient temperatures; and, FIGURES 4, 5 and 6 illustrate alternative circuitry within the rectangle of FIGURE 1 for providing the proper temperature compensating direct current bias potential which may be used with the preferred embodiment of the present invention.

Referring to FIGURE 1, which sets forth schematically the circuit of the novel converter of the modulator type device of this invention, there is shown a circuit having a bridge-type configuration comprising respective impedance elements in each leg thereof which are illustrated as fixed resistors by reference numerals 1 and 2, a fixed capacitor device 3, and a variable impedance element 4, of the type possessing impedance value characteristics which are a function of bias potential. As an example only, and without intention or inference of a limitation thereto, this variable impedance element may be a semiconductor device of the silicon capacitor type. Silicon capacitor semiconductor devices are essentially reverse or slightly forward biased junction diodes whose capacitance value is a function of bias voltage and are commercially available. As the description of the operation of the novel device of this invention will be on the basis of the use of a semiconductor device of this type as the variable impedance element 4, it has herein been illustrated by a conventional diode symbol. However, it is to be specifically understood that other devices possessing impedance value characteristics which are a function of bias voltage may be substituted in the circuitry of this novel device without departing from the spirit of the invention. The impedance values of the resistors 1 and 2, capacitor 3 and diode 4 are arranged to provide an impedance balance with selected reference conditions. That is, at a specific ambient temperature, for example, room temperature, and in the absence of a direct current input signal, the impedance values of each element is selected to be such as to provide a balanced alternating current bridge. For the purpose of facilitating the balancing of the bridge, a potentiometer device 5 may be connected between resistor elements 1 and 2, with the wiper arm connected to ground or point-of-reference potentials 6, as indicated.

So that a source of direct current input signals to be amplified, not shown, may be connected across one diagonal of the bridge circuit in such a manner that these signals serve as a bias potential across diode 4, input circuit terminals 11 and 12 are provided and are shown connected to point 13 of the bridge circuit through alternating current decoupling resistor 14 and to the wiper arm of potentiometer 5 at the point-of-reference potential 6, respectively. With this connection, any direct current potential which is applied to input circuit terminals 11 and 12 will appear across the diode 4 since its leakage resistance is several orders of magnitude greater than the total resistance value of resistor 2 plus that portion of the resistance of potentiometer 5 between the wiper arm and resistor 2, and will thereby serve as the bias potential across the diode 4.

Any one of the numerous conventional oscillator devices may serve as the source of alternating current signals to be modulated which is connected across the opposite diagonal of the bridge circuit. As conventional oscillators are well known in the art and the details form no part of this invention, it is herein indicated in schematic form by reference numeral 7 and is shown to be transformer connected through coupling transformer 8 to points 9 and 10 of the bridge configuration of the device of this invention.

So that the amplitude modulated alternating current signals may be taken from the modulator device and used in external equipment, not shown, output circuit terminals 15 and 16 are provided and are connected to point 13 of the bridge circuit through direct current decoupling capacitor 17 and inductor 18 and to the point-of-reference potential 6, respectively. The inductance value of inductor 18 is selected to be of such a value as to series resonate with the capacitance values of capacitor 3 and diode 4 to provide for maximum power transfer to output terminals 15 and 16.

While the various elements of the circuitry of the device of this invention which have just been described are all that is required for the theoretical operation thereof, as a practical matter, the stray capacitance and other bridge residuals may be required to be compensated for if the ultimate in sensitivity is to be realized. Therefore, adjustable capacitors 19 and 20 may be employed and interconnected with the bridge circuitry as indicated in FIGURE 1. With these connections, adjustable capacitor 19 provides a vernier null adjustment made necessary by the finite resolution of resistor 1 while adjustable capacitor 20 may be employed to balance the bridge for stray capacitance.

At any selected ambient operating temperature, for example, room temperature, and in the absence of a direct current input signal upon input terminals 11 and 12, potentiometer 5 may be adjusted to provide a substantially zero alternating current output signal across output terminals 15 and 16, thereby indicating an impedance balance within the bridge circuit.

With a silicon diode element, assumed to be used as variable impedance element 4 in the explanation of the operation of the device of this invention, the capacitance value increases as a forward bias is applied thereto and the capacitance value decreases as a reverse bias is applied thereto. As a direct current input signal is applied to input terminals 11 and 12, thereby providing a direct current bias potential across variable impedance element 4, in this instance a silicon diode, the capacitance value of diode 4 is altered, increasing with negative direct current input signals upon input terminal 11 and decreasing with positive direct current input signals upon input terminal 11. The direct current input signal, therefore, may produce a condition of imbalance within the bridge circuit regardless of polarity. Any degree of imbalance within the bridge circuit will result in an alternating current output signal being present upon output terminals 15 and 16 taken across the wiper arm of potentiometer 5 and point 13 of the bridge circuit, with the magnitude of the alternating current output signal being proportional to the degree of imbalance. Therefore, as the level of the direct current input signal varies and is impressed upon diode 4 as a variable bias potential, the degree of imbalance within the bridge circuit is varied, which results in an alternating current output signal, the magnitude of which is proportional to the levels of the direct current input signal. In this manner, the direct current input signal effects an amplitude modulation of the alternating current signals.

Referring now to FIGURE 2, the output alternating current signal is plotted against the direct current input signal potential level which may range from minus 70 millivolts direct current to positive 70 millivolts direct current. It may be noted that as the direct current input signal potential become less negative, thereby decreasing the forward bias potential across diode 4, the degree of impedance imbalance within the bridge decreases, resulting in a decreasing alternating current output signal magnitude. As the direct current input signal potential approaches zero, thereby producing a condition of impedance balance within the bridge circuit as outlined hereinabove as one of the selected reference conditions, the output alternating current signal magnitude approaches zero. As the direct current input signal potential goes positive, thereby increasing the reverse bias potential across diode 4, the degree of impedance imbalance within the bridge increases, resulting in an increasing alternating current output signal magnitude.

It has been found that, as is the case with most electrical components, the characteristics of the silicon diode used as the variable impedance element 4 in the circuit illustrated in FIGURE 1 changed with changes in ambient temperature in that, with an increase in ambient temperature, the capacitance value also increased. Referring to FIGURE 3, there is illustrated a curve which indicates the polarity and magnitude of a temperature compensating direct current potential bias required upon the silicon diode employed to maintain the bridge configuration in a balanced impedance condition over a temperature range from 32 degrees Fahrenheit to 131 degrees Fahrenheit with no direct current input signal. It may be noted from this curve that, with an increasing temperature, a decreasing forward bias is required to maintain the capacitance value of the silicon diode employed constant, because the capacitance value increased with temperature, until approximately 78 degrees Fahrenheit where no bias is required. As the temperature increases above 78 degrees Fahrenheit, to maintain the capacitance value constant, an increasing reverse bias is required.

To compensate for this temperature-capacitance characteristic, it is necessary that a temperature sensitive circuit which as arranged to provide a temperature compensating direct current bias potential, the magnitude of which is a function of ambient temperature, be provided and applied to diode 4 for the purpose of compensating for the changes in the capacitance value thereof over a wide ambient temperature range. As the temperature-capacitance characteristic of the silicon diode which was employed as variable impedance element 4 in the novel device of this invention was such that the capacitance value increased with an increase in temperature, it was necessary to provide a temperature compensating direct current bias potential which, when applied across diode 4, tended to decrease the capacitance value thereof with an increase in temperature and to increase the capacitance value thereof with a decrease in temperature. In the circuitry of FIGURE 4, in which like elements of FIGURE 1 have been given like characters of reference, a source of negative bias potential 21 is connected to point-of-reference potential 6 through a series resistor combination 22 and 23 wherein resistor 22 is a fixed resistor and resistor 23 is a resistor element, commercially available, possessing a positive temperature coefficient of resistance. That is, with an increase in temperature, the resistance value of this type resistor increases. With the circuitry as shown, the temperature compensating direct current bias potential present at point 24 should become increasingly negative with increasing temperature thereby reverse biasing diode 4, which tends to reduce the capacitance value thereof. As the resistive value of resistor element 23 increases with increases in temperature, the potential drop across resistor element 23 is increasingly greater than that across resistor 22, thereby rendering point 24 increasingly negative with an increase in ambient temperature.

Similarly, with the circuit configuration, as set forth in FIGURE 5, in which like elements of FIGURE 1 have been given like characters of reference, a source of negative potential 21 is connected through a series resistor pair 22 and 25 to point-of-reference potential 6. In this instance, however, resistor element 25 is of the thermistor type, commercially available, which has a negative temperature coefficient of resistance. That is, with an increase in temperature, the resistance value of this type resistor decreases. For the same reasons as outlined in the description of the circuitry of FIGURE 4, the temperature compensating direct current bias potential present at point 24 should become increasingly negative with increasing temperatures thereby reverse biasing diode 4, which tends to reduce the capacitance value thereof. As the resistance value of element 25 decreases with increases in temperature, the potential drop across element 25 becomes increasingly less than that across resistor 22, thereby rendering point 24 increasingly negative with an increase in ambient temperature.

The curve of FIGURE 3 indicates that a temperature compensating direct current bias potential of a value ranging from negative 65 millivolts to positive 75 millivolts, or a 135 millivolt span, may be required to properly compensate for a temperature range of 99° Fahrenheit from 32° to 131°. The arrangements of FIGURES 4 and 5 provide for this 135 millivolt span of temperature compensating direct current bias potential; however, the bias potential is always of the same polarity. FIGURE 6, however, illustrates a scheme which may provide the temperature compensating direct current bias potential of different polarities as indicated in FIGURE 3.

The circuitry of FIGURE 6, in which like elements of FIGURE 1 have been given like characters of reference, is slightly more sophisticated than that indicated in either of FIGURES 4 or 5 and shows a source of direct current potential 26 of the type which has symmetrical output potentials in respect to point-of-reference potential 6, as indicated. This direct current potential source 26 is connected across a voltage divider network of four series resistor elements 27, 28, 29 and 30, as shown. For the same reasons as set forth in the explanation of the temperature compensating circuitry of FIGURE 4, to properly compensate for increases in ambient temperature, the temperature compensating direct current bias potential present at point 24 should become increasingly negative with ambient temperature increases, thereby reverse biasing element 4, which tends to reduce its capacitance value. In the voltage divider network of resistors 27, 28, 29 and 30, resistors 27 and 30 are of a fixed value and are equal to each other, while resistor element 28 is of the type possessing a positive temperature coefficient of resistance and element 29 is of the type having a negative temperature coefficient of resistance. With increases in ambient temperature, therefore, the total resistance value of elements 27 and 28 increase, while the total resistance value of elements 29 and 30 decrease. With this arrangement, therefore, with increases in ambient temperature, the compensating direct current bias potential at point 24 becomes increasingly negative, as required.

In describing the circuitry necessary to provide a temperature compensating direct current bias potential, the magnitude of which is a function of ambient temperature, for compensating for changes in the capacitance value of diode 4, certain specific potential polarities and arrangement of resistors have been shown. It is to be understood that the three examples herein outlined are illustrative only and that other methods of providing this circuitry are envisioned, depending upon the temperature-capacitance characteristic of element 4, the point where the compensating direct current bias potential is applied thereto and the arrangement of the resistor elements which are variable with temperature in relation to the source of direct current potential used therewith.

While a preferred embodiment of the present invention has been shown and described, it is to be specifically understood that various modifications and substitutions may be made without departing from the spirit of the invention which is to be limited only within the scope of the appended claims.

What is claimed is:

1. A converter of the modulator type for converting direct current signals to amplitude modulated alternating current signals comprising, a bridge circuit having respective impedance elements in each leg thereof arranged to provide an impedance balance with selected reference conditions and wherein solely one of said impedance elements is a variable impedance element of the type possessing impedance value characteristics which are a function of bias potential, means for connecting a source of direct current input signals across one diagonal of said bridge circuit in such a manner that the direct current input signals serve as a bias potential across said variable impedance element thereby producing varying degrees of impedance imbalance within said bridge circuit with changes in magnitude of the direct current input signals, a source of alternating current signals connected across the opposite diagonal of said bridge circuit whereby the impedance imbalance within said bridge circuit as produced by the direct current input signals results in the conduction therethrough of said alternating current signals, the magnitude of which is a function of the degree of impedance imbalance thereby effecting an amplitude modulation of said alternating current signals by the direct current input signals, and output circuit means connected to said bridge circuit from which the modulated alternating current signals may be taken.

2. A converter of the modulator type of converting direct current signals to amplitude modulated alternating current signals comprising, a bridge circuit having respective impedance elements in each leg thereof arranged to provide an impedance balance with selected reference conditions and wherein solely one of said impedance elements is a variable impedance element of the type possessing impedance value characteristics which are a function of bias potential, means for connecting a source of direct current input signals across one diagonal of said bridge circuit in such a manner that the direct current input signals serve as a bias potential across said variable impedance element thereby producing varying degrees of impedance imbalance within said bridge circuit with changes in magnitude of the direct current input signals, a source of alternating current signals connected across the opposite diagonal of said bridge circuit whereby the impedance imbalance within said bridge circuit as produced by the direct current input signals results in the conduction therethrough of said alternating current signals, the magnitude of which is a function of the degree of impedance imbalance thereby effecting an amplitude modulation of said alternating current signals by the direct current input signals, temperature sensitive means connected to said variable impedance element in such a manner as to provide a temperature compensating direct current bias potential the magnitude of which is a function of ambient temperature for compensating for changes in the impedance value of said variable impedance element with changes in ambient temperature, and output circuit means connected to said bridge circuit from which the modulated alternating current signals may be taken.

3. A converter of the modulator type for converting direct current signals to amplitude modulated alternating current signals comprising, a bridge circuit having respective impedance elements in each leg thereof arranged to provide an impedance balance with selected reference conditions and wherein solely one of said impedance elements is a variable capacitance element of the type possessing capacitance value characteristics which are a function of bias potential, means for connecting a source of direct current input signals across one diagonal of said bridge circuit in such a manner that the direct current input signals serve as a bias potential across said variable capacitance element thereby producing varying degrees of impedance imbalance within said bridge circuit with changes in magnitude of the direct current input signals, a source of alternating current signals connected across the opposite diagonal of said bridge circuit whereby the impedance imbalance within said bridge circuit as produced by the direct current input signals results in the conduction therethrough of said alternating current signals, the magnitude of which is a function of the degree of impedance imbalance thereby effecting an amplitude modulation of said alternating current signals by the direct current input signals, and output circuit means connected to said bridge circuit from which the modulated alternating current signals may be taken.

4. A converter of the modulator type for converting direct current signals to amplitude modulated alternating current signals comprising, a bridge circuit having respective impedance elements in each leg thereof arranged to provide an impedance balance with selected reference conditions and wherein solely one of said impedance elements is a variable capacitance element of the type possessing capacitance value characteristics which are a function of bias potential, means for connecting a source of direct current input signals across one diagonal of said bridge circuit in such a manner that the direct current input signals serve as a bias potential across said variable capacitance element thereby producing varying degrees of impedance imbalance within said bridge circuit with changes in magnitude of the direct current input signals, a source of alternating current signals connected across the opposite diagonal of said bridge circuit whereby the impedance imbalance within said bridge circuit as produced by the direct current input signals results in the conduction therethrough of said alternating current signals, the magnitude of which is a function of the degree of impedance imbalance thereby effecting an amplitude modulation of said alternating current signals by the direct current input signals, temperature sensitive means connected to said variable capacitance element in such a manner as to provide a temperature compensating direct current bias potential the magnitude of which is a function of ambient temperature for compensating for changes in the capacitance value of said variable capacitance element with changes in ambient temperature, and output circuit means connected to said bridge circuit from which the modulated alternating current signals may be taken.

5. A converter of the modulator type for converting direct current signals to amplitude modulated alternating current signals comprising, a bridge circuit having respective impedance elements in each leg thereof arranged to provide an impedance balance with selected reference conditions and wherein solely one of said impedance elements is a silicon diode element of the type possessing variable capacitance value characteristics which are a function of bias potential, means for connecting a source of direct current input signals across one diagonal of said bridge circuit in such a manner that the direct current input signals serve as a bias potential across said silicon diode element thereby producing varying degrees of impedance imbalance within said bridge circuit with changes in magnitude of the direct current input signals, a source of alternating current signals connected across the opposite diagonal of said bridge circuit whereby the impedance imbalance within said bridge circuit as produced by the direct current input signals results in the conduction therethrough of said alternating current signals, the magnitude of which is a function of the degree of impedance imbalance thereby effecting an amplitude modulation of said alternating current signals by the direct current input signals, and output circuit means connected to said bridge circuit from which the modulated alternating current signals may be taken.

6. A converter of the modulator type for converting direct current signals to amplitude modulated alternating current signals comprising, a bridge circuit having respective impedance elements in each leg thereof arranged to provide an impedance balance with selected reference conditions and wherein solely one of said impedance elements is a silicon diode element of the type possessing variable capacitance value characteristics which are a function of bias potential, means for connecting a source of direct current input signals across one diagonal of said bridge circuit in such a manner that the direct current input signals serve as a bias potential across said silicon diode element thereby producing varying degrees of impedance imbalance within said bridge circuit with changes in magnitude of the direct current input signals, a source of alternating current signals connected across the opposite diagonal of said bridge circuit whereby the impedance imbalance within said bridge circuit as produced by the direct current input signals results in the conduction therethrough of said alternating current signals, the magnitude of which is a function of the degree of impedance imbalance thereby effecting an amplitude modulation of said alternating current signals by the direct current input signals, temperature sensitive means connected to said silicon diode element in such a manner as to provide a temperature compensating direct current bias potential the magnitude of which is a function of ambient temperature for compensating for changes in the capacitance value of said silicon diode element with changes in ambient temperature, and output circuit means connected to said bridge circuit from which the modulated alternating current signals may be taken.

References Cited in the file of this patent

UNITED STATES PATENTS

| | | |
|---|---|---|
| 1,739,005 | Karolus | Dec. 10, 1929 |
| 2,811,647 | Nilsson | Oct. 29, 1957 |
| 2,825,811 | Cooper | Mar. 4, 1958 |
| 2,885,496 | Kerns | May 5, 1959 |
| 2,911,597 | Lehman | Nov. 3, 1959 |
| 2,956,234 | Olsen | Oct. 11, 1960 |